United States Patent
Shen et al.

(10) Patent No.: US 9,430,407 B2
(45) Date of Patent: Aug. 30, 2016

(54) METHOD AND SYSTEM FOR SECURE STORAGE AND RETRIEVAL OF MACHINE STATE

(71) Applicant: QUALCOMM Incorporated, San Diego, CA (US)

(72) Inventors: Jian Shen, San Diego, CA (US); Lew Go Chua-Eoan, Carlsbad, CA (US)

(73) Assignee: QUALCOMM Incorporated, San Diego, CA (US)

(*) Notice: Subject to any disclaimer, the term of this patent is extended or adjusted under 35 U.S.C. 154(b) by 47 days.

(21) Appl. No.: 14/530,261

(22) Filed: Oct. 31, 2014

(65) Prior Publication Data

US 2016/0124869 A1 May 5, 2016

(51) Int. Cl.
| | |
|---|---|
| G06F 7/04 | (2006.01) |
| G06F 12/14 | (2006.01) |
| G06F 3/06 | (2006.01) |
| G06F 11/07 | (2006.01) |
| G06F 9/44 | (2006.01) |

(52) U.S. Cl.
CPC ......... G06F 12/1416 (2013.01); G06F 3/0622 (2013.01); G06F 3/0653 (2013.01); G06F 3/0673 (2013.01); G06F 9/4418 (2013.01); G06F 11/0727 (2013.01); G06F 11/0766 (2013.01); G06F 2212/1052 (2013.01)

(58) Field of Classification Search
CPC .......... G06F 12/1416; G06F 11/0766; G06F 3/0673; G06F 3/0622; G06F 11/0727; G06F 3/0653; G06F 2212/1052
USPC .......................................................... 726/17
See application file for complete search history.

(56) References Cited

U.S. PATENT DOCUMENTS

| | | | |
|---|---|---|---|
| 7,392,415 B2 | 6/2008 | Grawrock et al. | |
| 8,086,839 B2 | 12/2011 | Yao et al. | |
| 8,645,738 B2 | 2/2014 | Voutilainen | |
| 2003/0101312 A1 | 5/2003 | Doan et al. | |
| 2006/0294351 A1 | 12/2006 | Rostampour | |
| 2008/0201592 A1 | 8/2008 | Lawrence et al. | |
| 2009/0182929 A1 | 7/2009 | Hwang et al. | |
| 2010/0005317 A1 | 1/2010 | Pribadi et al. | |
| 2010/0034391 A1* | 2/2010 | Yamagishi | G06F 21/10 380/278 |
| 2011/0238967 A1 | 9/2011 | Challener et al. | |
| 2013/0262898 A1 | 10/2013 | Preston et al. | |
| 2014/0098959 A1* | 4/2014 | Kawamura | B60R 25/24 380/277 |

OTHER PUBLICATIONS

International Search Report and Written Opinion—PCT/US2015/053648—ISA/EPO—Dec. 10, 2015.

* cited by examiner

*Primary Examiner* — Mohammad W Reza
(74) *Attorney, Agent, or Firm* — Muncy, Geissler, Olds & Lowe, P.C.

(57) ABSTRACT

A machine state vector is received at a memory. The machine state vector has a machine state and a machine identifier. Write access qualification is met if the machine state entry is an initial write, or if the machine identifier matches the machine identifier of a stored machine state vector, and machine identifier and machine state are stored in the memory. A fetch machine state request is received, having a requestor machine identifier. A machine state retrieval qualification is met by the requestor machine identifier matching the stored machine identifier, and the machine state is retrieved.

31 Claims, 3 Drawing Sheets

METHOD AND SYSTEM FOR SECURE STORAGE AND RETRIEVAL OF MACHINE STATE

FIELD OF DISCLOSURE

The present application is generally related to processors and, more particularly, to secure, non-volatile storage of processor data.

BACKGROUND

Known conventional processor systems can include processors, or cores, connected via a common bus to shared memory, and to user interfaces, wireless transceivers, and other shared resources. In certain applications, power can be conserved by powering down and powering up processors in response to changing applications, tasks, and periods of non-use, e.g., time outs. Certain applications of power-down and power-up can also be referred to, respectively, as entering a "sleep state" and "wake-up" from a sleep state.

In certain applications, power-down/power-down of a processor can incur costs in terms of time to recover a processor state. In certain applications, the time cost may be incurred not only by the processor undergoing the power-down/power-up, but also by, for example, other processors and process flows within and interfacing the processor system.

Storing the processor state in a memory is one known, conventional technique directed to reducing the time lost to recovering the processor state upon wake-up.

However, such conventional techniques have various shortcomings. One shortcoming is security. If the memory is external to the processer, with shared accessibility, there may be vulnerability to unauthorized access. If the memory is internal to the processor, then flexibility may be compromised because authorized external access to the stored processor state, for example, while the processor is in a sleep state, may be difficult and/or costly to implement.

SUMMARY

This Summary identifies some features and is not, and is not intended to be an exclusive or exhaustive treatment description of the disclosed subject matter. Additional features and further details are found in the detailed description and appended claims. Inclusion in the Summary is not reflective of importance. Additional aspects will become apparent to persons skilled in the art upon reading the following detailed description and viewing the drawings that form a part thereof.

Methods are disclosed that can provide secure storage of a machine state. In an aspect, examples can include receiving at a memory a machine state vector, the machine state vector comprising a machine state and a machine identifier, wherein the machine state can be a state of a machine identified by the machine identifier. Examples can include determining whether a write access qualification is satisfied. In further aspects, examples of determining whether a write access qualified is met may comprise determining whether a writing of a machine state entry for the machine identified by the machine identifier will be an initial write. In an aspect, the initial write may be of a machine state entry for the machine identified by the machine identifier. In an aspect, examples can include, upon determining that the writing of the machine state entry will be an initial write, establishing the write access qualification as satisfied and, upon the write access qualification being satisfied, storing, in the memory, a current valid machine state entry. In an aspect, the current valid machine state entry may comprise the machine state and, as a current stored machine identifier associated with the valid machine state entry, the machine identifier.

Example apparatuses for secure memory state storage according to various aspects are disclosed. In an aspect, examples can comprise a memory that may be configured to store a machine state entry. In an aspect, the machine state entry may have an access security field and a stored machine state field. In an aspect, the access security field may be configured to hold a stored machine identifier and the stored machine state field may be configured to hold a stored machine state. In an aspect, one or more examples apparatuses can comprise a memory access logic that can be configured to control access to the machine state entry in the memory. According to various aspects, memory access logic may be configured to receive a machine state vector, and the machine state vector may include a machine state and a machine identifier. In an aspect, memory access logic may be configured to determine, in association with receiving the machine state vector, whether a write access qualification is satisfied. In an aspect, memory access logic can be further configured to store in the memory, upon the write access qualification being satisfied to store in the memory a current valid machine state entry, the current valid machine state entry comprising the machine state and, as a current valid stored machine identifier associated with the valid machine state entry, the machine identifier, in a manner retrievable based on the current valid stored machine identifier.

In an aspect, example apparatuses can comprise means for receiving a machine state vector, and the machine state vector may include the machine state and a machine identifier and means for determining whether a write access qualification is satisfied. In an aspect, means for determining whether a write access qualification is satisfied can comprise means for determining whether a writing of a machine state entry to a memory will be an initial write, wherein an initial write is a write of the machine state entry when the memory does not already store a current valid machine state entry, and means for establishing, upon determining that the writing of the machine state entry will be an initial write, that the write access qualification is satisfied. In an aspect, one or more disclosed apparatuses can further comprise means for storing in the memory, upon the write access qualification being satisfied, a current valid machine state entry. In an aspect, the current valid machine state entry may comprise the machine state and, as a current stored machine identifier associated with the valid machine state entry, the machine identifier. In an aspect, the current valid machine state entry can be stored in a manner retrievable based on the stored machine identifier.

In an aspect, examples of non-transitory computer-readable medium are disclosed, comprising code, which, when executed by a processor, can cause the processor to perform operations for secure storage of a machine state. In an aspect, example code may cause the processor to receive a machine state vector, wherein the machine state vector can include the machine state and a machine identifier, and may cause the processor to determine whether a write access qualification is satisfied. In an aspect, causing the processor to determine whether a write access qualification of satisfied can comprise causing the computer to determine whether a writing of a machine state entry to a memory will be an initial write, wherein an initial write is a write of the machine state entry when the memory does not already store a current valid machine state entry, and to establish, upon determining that the writing of the machine state entry will be an initial write, that the write access qualification is satisfied. In an aspect, code ma further cause the processor to store in the memory, upon the write access qualification being satisfied, a current valid machine state entry, the current valid machine state entry comprising the machine state and, as a current valid stored machine identifier associated with the valid machine state entry, the machine identifier, in a manner retrievable based on the stored machine identifier.

BRIEF DESCRIPTION OF THE DRAWINGS

The accompanying drawings are presented to aid in the description of aspects of the invention nd are provided solely for illustration and not any limitation thereof.

DETAILED DESCRIPTION

Figure 1:
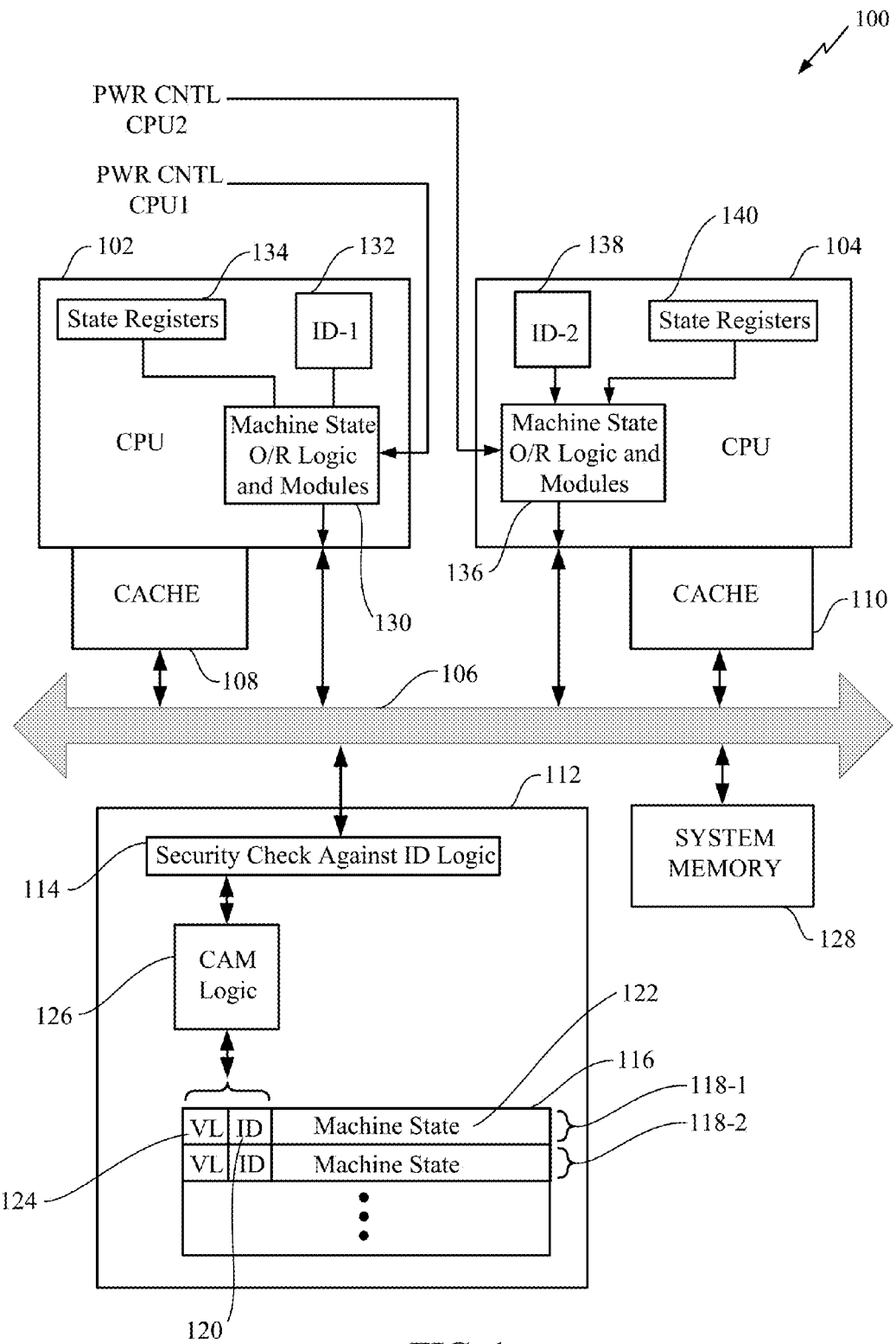
FIG. 1 shows one functional block diagram of one example ID-qualified secure access machine state storage and retrieval system in accordance with one or more aspects.

Aspects of the invention are disclosed in the following description and related drawings directed to specific exemplary aspects. Alternate aspects may be devised without departing from the scope of the invention. In certain described example implementations, instances are identified where various component structures and portions of operations can be taken from known, conventional techniques, and then arranged in accordance with one or more aspects. In such instances, internal details of the known, conventional component structures and/or portions of operations are omitted to help avoid potential obfuscation of inventive concepts.

The terminology used herein is only for the purpose of describing particular aspects and is not intended to limit the scope of the invention.

The word "exemplary," as used herein, means "serving as an example, instance, or illustration." Accordingly, the term "exemplary aspect," as used herein, means an aspect serving as an example, instance, or illustration, but that is not necessarily preferred or advantageous over other aspects. Likewise, it will be understood that the term "aspects of the invention," as used herein in reference to a feature, advantage or mode of operation, does not mean that all aspects of the invention include the discussed feature, advantage or mode of operation.

As used herein, the singular forms "a", "an" and "the" are intended to include the plural forms as well, unless the context clearly indicates otherwise. The terms "comprises", "comprising," "includes" and/or "including", when used herein, specify the presence of stated features, integers, steps, operations, elements, and/or components, but do not preclude the presence or addition of one or more other features, integers, steps, operations, elements, components, and/or groups thereof.

Certain aspects are described in terms of operations and steps, for example, in or relating to various processes of design and fabrication. It will be understood that except in instances where explicitly stated otherwise, or where made clear from a particular context, that the described order of such operations and steps is only for purposes of example, and is not necessarily limiting of the order of operations or steps that may be applied in practices according to various exemplary aspects.

In addition, operations in various processes are described in reference to flow diagrams. It will be understood that the flow diagrams do not necessarily mean that operations shown by one block terminate, or cannot continue upon commencement of operations shown by another block.

Certain aspects are described in terms of example operations, steps, actions and sequences of operations, steps and actions that can performed by or under control of, for example, a computing device or elements of a computing device. It will be understood by persons of ordinary skill, upon reading this disclosure, that such operations, steps, actions, sequences and other combinations thereof can be performed by, or under control of specific circuits (e.g., application specific integrated circuits (ASICs)), by program instructions being executed by one or more processors, or by a combination of both.

Accordingly, it will be appreciated by such persons that operations, steps, actions, sequences and other combinations thereof can be embodied entirely within any form of computer readable storage medium having stored therein a corresponding set of computer instructions that, upon execution, can cause an associated processor to perform, directly or indirectly, operations, steps, actions, sequences and other combinations described herein. Thus, the various aspects of the invention may be embodied in a number of different forms, all of which are contemplated to be within the scope of the claimed subject matter.

Systems and devices in accordance with one or more exemplary embodiments can provide ID-restricted machine state storage and retrieval capabilities that can enable, among other features, power-down and power up of one or more processors, without loss of machine state, and with security preventing unauthorized access or corruption. To assist in description of examples, processor systems having ID-restricted machine state storage and retrieval capabilities in accordance with one or more exemplary embodiments will be referred to as "ID-restricted machine state storage and retrieval" system(s), (or apparatus, method(s) or process(es)) or the term's coined abbreviated form "IDS-SR" system (or apparatus, method(s) or process(es)). It will be understood that the term "ID-restricted machine state storage and retrieval", and the abbreviation "IDS-SR" are arbitrarily selected names that are not intended as any limitation on structures that may embody disclosed features and aspects. It will also be understood that description of subject matter without accompaniment with the term "ID-restricted machine state storage and retrieval" or the abbreviation "IDS-SR" does not necessarily mean the subject matter is not an aspect of, or associated with IDS-SR and related aspects.

One IDS-SR system according to one or more exemplary embodiments may include a central processing unit (CPU) with an interface to a system bus, and an ID-based restricted access non-volatile memory (NVM) that also interfaces to the system bus. For brevity, the phrase "ID-based restricted access" will be recited, alternatively, by Applicant's coined abbreviation for the same, "ID-RA." The ID-assigned CPU may comprise a conventional CPU core, for example an ARM-type core, in combination with a machine state offloading and retrieval logic, and a particularly assigned local non-volatile memory, for example, a non-volatile register, configured to store a machine ID. The local non-volatile memory configured to store the at least one machine ID may be termed a "machine ID register." The machine ID may be system assigned and, in an aspect, may be unique to the CPU. In an aspect, normal mode operating logic of the CPU, and/or the machine state offloading and retrieval logic, may be configured such that the CPU is incapable of accessing or altering the machine-ID non-volatile register via execution of any user input instruction.

As to where in the CPU the machine state data may, in an aspect these can be locations assigned by the system, and may be known a priori by the machine state offloading and retrieval logic. For purposes of description, the locations may be referred to as the "machine state register." It will be understood that the "machine state register" of the CPU is a logical designation, and is not necessarily limited to any particular hardware device.

In an aspect, the machine state offloading and retrieval logic may be configured to generate, in response to the "start power-down" control signal, a packet that may be referred to as the "machine state vector." In an aspect, the machine state vector may have a security field and a machine state field. In a further aspect, the machine state offloading and retrieval logic may be configured to perform operations that include inserting the machine ID in the security field, inserting the machine state data in the machine state field, and then sending the resulting machine state vector to the ID-RA NVM.

In an aspect, operations may include receiving at a memory, e.g., the ID-RA NVM, the machine state vector, the machine state vector comprising the machine state and a machine identifier and, in response determining whether a write access qualification is satisfied. In an aspect, determining whether a write access qualification is satisfied can include determining whether a writing of a machine state entry will be an initial write. As described in further detail elsewhere in this disclosure, an initial write may be a write of the machine state entry when the memory e.g., the ID-RA NVM, does not store any current valid machine state entry. In a further aspect, upon determining that the writing of the machine state entry will be an initial write, operations may include establishing the write access qualification as satisfied. In a related aspect, upon the write access qualification being satisfied, operations may include storing the machine identifier and the machine state in the memory (e.g., the ID-RA NVM) as the current valid machine state entry In an aspect, the CPU may be configured to enter, or be externally switched to, a power-down or sleep state after generating and sending the machine state vector.

Regarding types of information may constitute "machine state data," the range may be, at least in part, application-specific. As illustration, web-banking applications are one type of application that a CPU in systems and processes according to exemplary embodiments may be performing when it receives the start power-down control signal. In such applications, the machine state data may include sensitive, or otherwise confidential data, for example, a user's bank account access PIN. Systems and methods according to various exemplary embodiments can provide, among features, interrupt and power-down of the CPU during such a session, for other processor resources to perform another task, followed by a power-on and machine state restoration to continue the session.

In an aspect, the ID-RA NVM may be configured to store machine states from received machine state vectors in a table that may be termed a "machine state table." It will be understood that the term "table," in the context of the "machine state table," is intended as a functional aspect and is not intended to limit structure or architectures by which the machine state table or the ID-RA NVM may be implemented. In an aspect, the ID-RA NVM may be configured as magneto-resistive memory, having a content addressable memory (CAM) access logic that reads or extracts the machine state from the machine state field of a received machine state vector, and stores the machine state such that it is retrievable according to the machine ID. The CAM access logic may store the machine state and the machine ID in an entry that can be termed, for convenience, a "machine state entry." As will be described in further detail in later sections of this disclosure, in an aspect, the machine state entries may have a validity field having a value that be switched between or set at a valid value and a not valid value. In an aspect, a machine state entry having a valid value in its validity field may be alternatively referred to as a "current valid machine state entry."

In an additional aspect, the ID-RA NVM may be configurable to determine, upon receiving a machine state vector, whether the machine state vector is an initial write. According to this aspect, as will be described in further detail later in this disclosure, if the machine state vector is an initial write the ID-RA NVM is not holding or storing any current valid machine state entry and, therefore, it extracts the machine state from the machine state field and stores it as described hereinabove. Further to this aspect, the ID-RA NVM may be configured such that, if it determines a received machine state vector is not an initial write, it will check whether the machine ID matches the machine ID of the current valid machine state entry. The ID-RA NVM may be further configured such that if the IDs match, it will extract the machine state from the machine state field and stores it as described hereinabove. The ID-RA NVM, in a further aspect, can be configured to generate an error signal if the IDs do not match.

In an aspect, the machine state offloading and retrieval logic of the CPU may be configured to perform a power-up or wake-up sequence starting, for example, in response to receipt of a "start power-up" control signal. The start power up control signal may be generated externally, in response to certain events that warrant switching the CPU back to a power-up state. In an aspect, the machine state offloading and retrieval logic may be configured to respond to the start power up control signal by generating what may be termed a "fetch machine state" request. In an aspect, the fetch machine state request may be configured with a security field. In an aspect, the machine state offloading and retrieval logic may be configured to insert the machine ID into the security field, and then send the fetch machine state request, through the system bus, to the ID-RA NVM.

As later described in further detail, in an aspect, the ID-RA NVM may be configured to view or treat the machine-ID in the security field of a received fetch machine state request as a "requestor machine-ID." In an aspect, the ID-RA NVM may be configured to determine, in response to receiving a fetch machine state request, whether the requestor machine ID of the received fetch machine state request matches a stored machine-ID, i.e., the machine ID of a current valid machine state entry that the ID-RA NVM has currently stored. The ID-RA NVM may include ID-based security check logic configured to determine whether the machine ID of the received fetch machine state request matches a stored machine-ID. In an aspect, the ID-based security check logic may be configured, relative to a port of the ID-RA NVM and the machine state table, such that unauthorized access of a currently valid machine state entry can have difficulty that may approach the physically impossible. In an aspect, the ID-RA NVM may be configured such that, if requestor machine ID in a received fetch machine state request matches a stored machine-ID of a current valid machine state entry, then the ID-RA NVM sends the request machine a responsive communication having the stored machine state.

In an aspect, IDS-SR systems according to various exemplary embodiments may include two or more CPUs, each having its own machine state vector offloading and retrieve logic, and each being assigned its own unique machine ID. Accordingly, the ID-RA NVM may be shared by multiple CPUs, each being powered up and powered down by a system power manager.

FIG. 1 shows a block diagram of one IDS-SR system 100 according to one or more exemplary embodiments. The IDS-SR system 100 may include only a single CPU but, for purposes of illustrating aspects, is shown as comprising a first CPU 102 and a second CPU 104. To avoid description of details not pertinent to the embodiments, it may be assumed that the first CPU 102 and the second CPU 104 are identically structured. Identical structure is only an example, as the first CPU 102 and the second CPU 104 can have substantially different structures. It will also be understood that embodiments are not limited to any specific population of processors or CPUs. For example, embodiments contemplate a single CPU, as well as three or more CPUs.

Referring to FIG. 1, the first CPU 102 may interface, by a first CPU bus interface (visible in FIG. 1, but not separately labeled), to a system bus 106. The first CPU 102 may also couple, via a local interface (not explicitly visible) to a first CPU local cache 108 that also interfaces to the system bus 106. The second CPU 104 may interface to the system bus 106 by an associated second CPU bus interface (visible in FIG. 1, but not separately labeled). The second CPU 104 may also couple to an associated second CPU local cache 110 that, in turn, may also interface to the system bus 106. It will be understood that neither the first CPU local cache 108 nor the second CPU local cache 110 are necessarily particular to the embodiments. It will also be understood that the first CPU local cache 108, or the second CPU local cache 110, or both, may be omitted.

In an aspect, the IDS-SR system 100 may include an ID-based restricted access (ID-RA) non-volatile memory (NVM) 112 that interfaces to the system bus 106. In an aspect, the ID-RA NVM 112 may include a "security check against ID" logic 114 that may be configured to receive particular ID-based access requests from the first CPU 102 or from the second CPU 104, or both. The particular ID-based access requests may include write requests, such as the machine state vectors described previously in the disclosure, and that will be described in further detail later. The particular ID-based access requests may include read requests, such as the machine state fetch requests described previously in this disclosure and that will be described in further detail later.

In an aspect, the ID-RA NVM 112 may include a table, such as the machine state table 116, which may be configured to hold one or more entries, which may be termed "current machine state entries," examples of which are shown by the current state vector entry 118-1 and the current machine state vector entry 118-2. It will be understood that the machine state table 116 may be a "table" only in a logical sense of having entries with logical fields, and in which one or more of the logical fields may be search or address fields. Machine state vector entries in the machine state table 116, such as current machine state entry 118-1 and the current machine state entry 118-2, may be generically referred to as "current machine state entries" 118 (a reference number that does not separately visible appear on FIG. 1). In an aspect, each of the current machine state entries 118 may have an entry security field 120, and a stored machine state field 122. The entry security field 120 and the stored machine state field 122 may correspond, respectively, to the entry security field and the stored machine state field of the machine state vectors described previously in this disclosure, and as described in further detail later.

In an aspect, the current machine state entries 118 may also include a validity field, such as the validity field 124. In an aspect, operations can include initializing the ID-RA NVM 112 memory, wherein the initializing can include setting the validity field 124 of the machine state entries 118 to a not valid value. For example, the validity field 124 of all the current machine state entries 118 may be initialized to a not valid state, for example logical "0" and then set to a valid state, for example logical "1" when a new value for the entry security field 120, and a stored machine state field 122 are written. In an aspect, each of the current machine state entries 118 having valid state in its validity field 124 may be referred to as a "current valid machine state entry" 118. In a related aspect, the machine state identifier in the entry security field 120 of a current valid machine state entry will be alternatively referred to as a "current stored machine identifier." In an aspect, a retrieval of a machine state entry 118 in response to an ID-based access request requires meeting a machine state retrieval qualification. The machine state retrieval qualification can include a concurrency of the validity field 124 of the machine state entry 118 being at the valid value and the requestor machine identifier matching the current stored machine identifier. In a further aspect, upon the machine state vector for a current valid machine state entry 118 being retrieved by the appropriate process, the validity field 124 and the associated machine state field 122 for that current valid machine state entry 118 may be cleared to logical 0. It will be understood that the example assignment of logical "0" and logical "1" to represent a valid and not valid state of the current machine state entries was arbitrarily selected, and is not intended as any limitation on the scope of any exemplary embodiments or aspects thereof.

In an aspect, the machine state table 116 of the ID-RA NVM 112 may be implemented by a magneto-resistance memory random access memory (MRAM) (not separately visible in FIG. 1). Accordingly, the ID-RA NVM 112 may include MRAM write logic and write circuitry, and MRAM read logic and read circuitry (not explicitly visible in FIG. 1). Other than logic for applying ID-based access rules as described in this disclosure, known conventional MRAM write logic and write circuitry and known conventional MRAM read logic and read circuitry may be used. Various techniques for such conventional MRAM write and read logic and circuitry are known to persons of ordinary skill in the art and, therefore, further detailed description is omitted.

In describing certain aspects, and example operations illustrating certain aspects, the phrase "initial write" is used in the context of describing writing of machine state entries, to reduce repetition of description. In this context, the phrase "initial write" means writing to a machine state vector entry in the ID-RA NVM that does not currently store any current valid machine state entry. In an aspect, determining that a writing of a machine state vector to a current machine state entry will be an initial write is sufficient to establish a write access qualifier, for that machine state vector entry, being satisfied. The write access qualifier is established as qualified because, being an initial write, there is no privileged or protected information in that machine state vector entry that would be overwritten.

Referring to FIG. 1, the security check against ID logic 114 may be configured to apply ID-based write access rules and ID-based read access rules. The security check against ID logic 114 may access the machine state table 116 through, or by operations in concert with a content addressable memory (CAM) access logic 126. Regarding ID-based write access rules, the security check against ID logic 114 and CAM access logic 126 may apply ID-based write access rules to received machine state vectors. If the ID-based write access rules are met, the CAM access logic 126 may enter (i.e., write) the received machine state vector in the machine state table 116 as a current valid machine state entry 118. Regarding ID-based read access rules, these may comprise the security check against ID logic 114 and CAM access logic 126, upon receiving a fetch machine state request (e.g., issued by one of the first CPU 102 and second CPU 104 in response to receiving a power-up control signal) may inspect the requestor machine ID in the security field and, if it matches the machine ID in the entry security field 120 of a current valid machine state entry 118, will send a response packet to the requestor. In addition, the security check against ID logic 114 and CAM access logic 126 may be configured such that, upon receiving a fetch machine state request, if the requestor machine ID does not match the current stored machine identifier of any current valid machine state entry 118, an error operation or error procedure may be executed.

Referring to FIG. 1, the IDS-SR system 100 may include a system memory resource, such as the system memory 128, which may interface to the system bus 106. The system memory 128 may be a single device, or may be a distributed resource (not explicitly visible). The system memory 128 may include, or be associated with, a memory management unit (MMU) resource (not explicitly visible in FIG. 1). The system memory 128 may store first machine readable instructions (not separately visible in FIG. 1) that, when fetched and executed by the first CPU 102, cause the first CPU 102 to perform various instruction-defined operations. The system memory 128 may, likewise, store second machine readable instructions (not separately visible in FIG. 1) that, when fetched and executed by the second CPU 104, cause the second CPU 104 to perform various instruction-defined operations.

Continuing to refer to FIG. 1, in an aspect, the first CPU 102 may include a machine state offloading and retrieval logic 130. The first CPU 102 may also include a first CPU machine ID register 132. In an aspect the first CPU machine ID register 132 may be implemented with a conventional non-volatile memory device, i.e., a non-volatile latch. Various techniques for conventional non-volatile latches are known to persons of ordinary skill in the art. Therefore, further detailed description of such devices is omitted. Alternatively, the first CPU machine ID register 132 may be implemented with a conventional one-time programmable device. Various techniques for conventional one-time programmable devices are known to persons of ordinary skill in the art. Therefore, further detailed description of such devices is omitted. In another alternative, the first CPU machine ID register 132 may be implemented as hardwired (fixed value) at design time. Various techniques for conventional hardwired data values are known to persons of ordinary skill in the art. Therefore, further detailed description of such devices is omitted.

In an aspect, the first CPU machine ID register 132 may be configured to store at least one machine ID, such as the example machine ID "ID-1" in FIG. 1. The ID-1 of the first CPU 102 may be a system assigned value and, in an aspect, may be unique to the first CPU 102. In an aspect, the first CPU 102 may include normal mode operating logic (not explicitly visible in FIG. 1, examples of which are described in further detail later in this disclosure. In an aspect, the normal mode operating logic of the first CPU 102, or the machine state offloading and retrieval logic 130, or both, may be configured such that the first CPU 102 is incapable of reading or altering the first CPU machine ID register 132 via execution of any user input instruction.

Regarding logic (not explicitly visible in FIG. 1) of the first CPU 102 that is not particular to, or does not pertain to IDS-SR functions, such logic may comprise, for example, an ARM-type pipeline CPU (not explicitly visible in FIG. 1). The ARM-type pipeline CPU may have (not explicitly visible in FIG. 1) clocked registers and latches, and logic circuits such as, but not limited to, arithmetic logic units (ALUs), instruction decoders, address generation logic, loop counters, and multiplexers. Architectures and implementations of ARM-type CPUs are well known in the art and, therefore, further detailed description is omitted. It will be understood that the first CPU 102 is not limited to an ARM-type architecture.

Referring to FIG. 1, in an aspect, the first CPU 102 may be configured to maintain data predetermined to be "machine state data." The machine state data may be data that the second CPU 104, in accordance with various exemplary embodiments, will offload upon being switched to a power-down state, and retrieve upon being stitched back to a powered-up state. Various aspects have no limitation on the specific location, or hardware devices within the first CPU 102 in which the machine state data may be stored. Example locations are collectively represented in FIG. 1 as the "first CPU machine state registers" 134. It will be understood that "register(s)," in the context of "first CPU machine state register" 134 has a logical meaning, and imparts no limitation as to structure or architecture. The first CPU machine state registers 134 may hold the machine state data in an encrypted form. Alternatively, the first CPU machine state registers 134 may hold the first CPU machine state data in an un-encrypted form.

With continuing reference to FIG. 1, in an aspect, the machine state offloading and retrieval logic 130 of the first CPU 102 may be configured to receive a power mode control signal, such as the example power mode control signal "PWR CNTL CPU1." The PWR CNTL CPU1 signal may comprise a start power down signal mode (not explicitly visible in FIG. 1) and a start power-up signal mode (not explicitly visible in FIG. 1). In an aspect, the machine state offloading and retrieval logic 130 may include an internal memory (not explicitly visible in FIG. 1), for example, a firmware-type non-volatile memory, that may store machine executable instructions for execution by the machine state offloading and retrieval logic 130. The machine executable instructions may comprise software modules, such as a power-down machine state offloading module and a power-up machine state retrieval module. Example processes that such software module may cause the machine state offloading and retrieval logic 130 of the first CPU 102 to perform are described in further detail, later in this disclosure.

Regarding the second CPU 104, in an aspect, it may be structurally identical to the first CPU 102. Alternatively, the second CPU 104 may be structurally different from the first CPU 102. For example, the second CPU 104 may be a more specialized CPU than the first CPU 102, such as a graphics processing unit (GPU) (not separately visible in FIG. 1). Architectures and implementations of various specialized CPUs, such as GPUs, are known to persons of ordinary skill art and, therefore, further detailed description is omitted.

In a related aspect, regardless of similarity, or differences between the first CPU 102 and the second CPU 104 with respect to logic not particular to IDS-SR, the second CPU 104 may be implemented with ID-SR logic such as the examples described in reference to the first CPU 102. For example the second CPU 104 may include a machine state offloading and retrieval logic 136, and a second CPU machine ID register 138 configured to store at least one machine ID, such as the example machine ID "ID-2." The ID-2 of the second CPU 104 may be a system assigned value that may be unique to the second CPU 104, similar to the machine ID-1 of the first CPU 102 being a system assigned value that may be unique to the first CPU 103. The second CPU machine ID register 138 may be implemented by conventional non-volatile technology as described for the first CPU machine ID register 132 may be implemented with a conventional non-volatile memory device, i.e., a non-volatile latch. In an aspect, the normal mode operating logic of the second CPU 104, or the machine state offloading and retrieval logic 136, or both, may be configured such that the second CPU 104 is incapable of reading or altering the second CPU machine ID register 138 via execution of any user input instruction.

Referring to FIG. 1, the second CPU 104 may be configured to maintain data predetermined to be "second CPU machine state data." Second CPU machine state data is data that the second CPU 104, in accordance with various aspects, will offload for secure storage upon being switched to a power-down state, and retrieve upon being stitched back to a powered-up state. Exemplary aspects have no limitation on the specific location, or hardware devices within the second CPU 104 in which the second CPU machine state data may be stored. Example locations are collectively represented in FIG. 1 as the second CPU machine state registers 140. It will be understood that the term "register(s)," in the context of "second SPU machine state registers" 140, has a logical meaning, and imparts no limitation as to structure or architecture. The second CPU machine state registers 140 may hold the second CPU machine state data in an encrypted form. Alternatively, the second CPU machine state registers 140 may hold the second CPU machine state data in an un-encrypted form.

With continuing reference to FIG. 1, in an aspect, the machine state offloading and retrieval logic 136 of the second CPU 104 may be configured to receive a power mode control signal, such as the example power mode control signal "PWR CNTL CPU2." The PWR CNTL CPU2 signal may comprise a start second CPU power down signal (not explicitly visible in FIG. 1) and a start second CPU power-up signal (not explicitly visible in FIG. 1). In an aspect, the machine state offloading and retrieval logic 136 may include an internal memory (not explicitly visible in FIG. 1), for example, a firmware-type non-volatile memory, that may store machine executable instructions. Such machine executable instructions may comprise software modules, such as a power-down machine state offloading module (not explicitly visible in FIG. 1) and a power-up machine state retrieval module (not explicitly visible in FIG. 1). Example processes that such software modules may cause the machine state offloading and retrieval logic 136 to perform may be comparable to the examples described in reference to the machine state offloading and retrieval logic 130 of the first CPU 102.

In one example configuration, the system memory 128 may store various modules, among which may be a secure session instruction module (not separately visible) for execution by either the first CPU 102 or the second CPU 104. It will be assumed for purpose of illustration that the example secure session instruction module is for execution by the first CPU 102. The secure session instruction module when executed by the first CPU 102, may control, or control in part, tasks such as user prompts, and interface protocol with external devices, in which user-confidential data may be input to or received at the IDS-SR system 100. For example, the secure session instruction module may be configured to perform, as the secure session, on-line banking transactions. In such on-line banking transactions the user, through a browser, e.g., Internet Explorer, Safari, Chrome, Firefox or equivalent, may access a web portal of his/her bank, and them in a typical prompt-type sequence established by the bank, performs a log-in. Communications and interfaces for log-in to such banking sessions are well-known in the art, and therefore further detailed description is omitted.

As also known in the art, typical web banking log-in can require the user to input confidential information, for example, a user name and password. In addition, after successful log-in, on-line banking procedures can include additional user-input and communication to and from the bank system, of additional confidential information. For example, the user's current account balances may be communicated to the user's device having, or embodying the IDS-SR system 100, for display and for other purposes, e.g., input to various accounting software programs (not explicitly visible in FIG. 1). The user name and password, and other such confidential information, may be referred to as "privileged data" (not explicitly visible in FIG. 1). It will be understood that "privileged" is an arbitrarily selected name, and has no intended meaning as a measure of security or inaccessibility, either absolute or relative to other terms such as, but not limited to, "secure," inaccessible," and/or "restricted access."

In an aspect, the secure session instruction module associated with the on-line banking transaction may be configured to store the privileged data in the first CPU machine state registers 134.

In an aspect, the IDS-SR system 100 may be configured to perform, for example in response to certain interrupt events during the secure session, for example, by default or by the user setting user preferences, certain other tasks. For purposes of example, the other tasks may be referred to as "interrupt tasks." The interrupt tasks may be non-secure tasks, for example, receiving text messages and other instant messaging communications, and receiving emails. In one example, procedures associated with the interrupt tasks may be performed on the second CPU 104. In such an example, there may be a desire, from a system power view, of switching the first CPU 102 to a power-down state while the second CPU 104 is performing operations associated with the interrupt task. Therefore, using known, conventional power management techniques (not explicitly visible in FIG. 1), the power-down signal mode of the PWR CNTL CPU1 signal may be generated and received by the machine state offload and retrieval logic 130 of the first CPU 102. It will be assumed that the machine state offload and retrieval logic 130 includes, for example, a power-down machine state read and offload software module as described previously in this disclosure, or an equivalent. In response to the power-down signal mode of the PWR CNTL CPU1 signal, the machine state offload and retrieval logic 130 may be configured, e.g., by its power-down machine state read and offload software module to perform a secure machine state offloading as will be described. In an aspect, the secure machine state offloading may include the machine state offloading and retrieval logic 130 reading the privileged data from the first CPU machine state registers 134, reading the first CPU ID-1 from the first CPU machine ID register 132, generating a corresponding machine state vector and sending that machine state vector to the ID-RA NVM 112.

Referring to FIG. 1, example operations that may be performed on, or by the IDS-SR system 100, may include receiving at a memory, e.g., the ID-RA NVM 112 a machine state vector, wherein the machine state vector includes a machine state and a machine identifier, e.g., the described machine vector generated by the first CPU 102 *n* response to the power-down signal mode of the PWR CNTL CPU1 signal. Example operations may further include, upon receiving the machine state vector, and assuming the machine state vector is not an initial write, determining whether the machine identifier matches a current stored machine identifier. For example, such operations may include determining whether the the ID-1 in the security field of a machine state vector received from the first CPU 102 matches a current stored machine identifier in the entry security field 120 of one of the current valid machine state entry 118. In addition, based at least in part upon determining the machine identifier, e.g., ID-1, matches the current stored machine identifier, storing the machine state as a valid machine state entry in the memory, e.g., in the machine state table 116 of the ID-RA NVM 112.

Continuing to refer to FIG. 1, example operations that may be performed on, or by the IDS-SR system 100, as described, may include receiving at a memory, e.g., the ID-RA NVM 112, a machine state retrieval request, e.g., the described fetch machine state request, wherein the machine state retrieval request has a requestor machine identifier. Example operations that may be performed on, or by the IDS-SR system 100, as described, in response to the machine state retrieval request can include determining whether the requestor machine identifier matches the current stored machine identifier and, upon determining the requestor machine identifier matches the current stored machine identifier, outputting the machine state entry.

Figure 2:
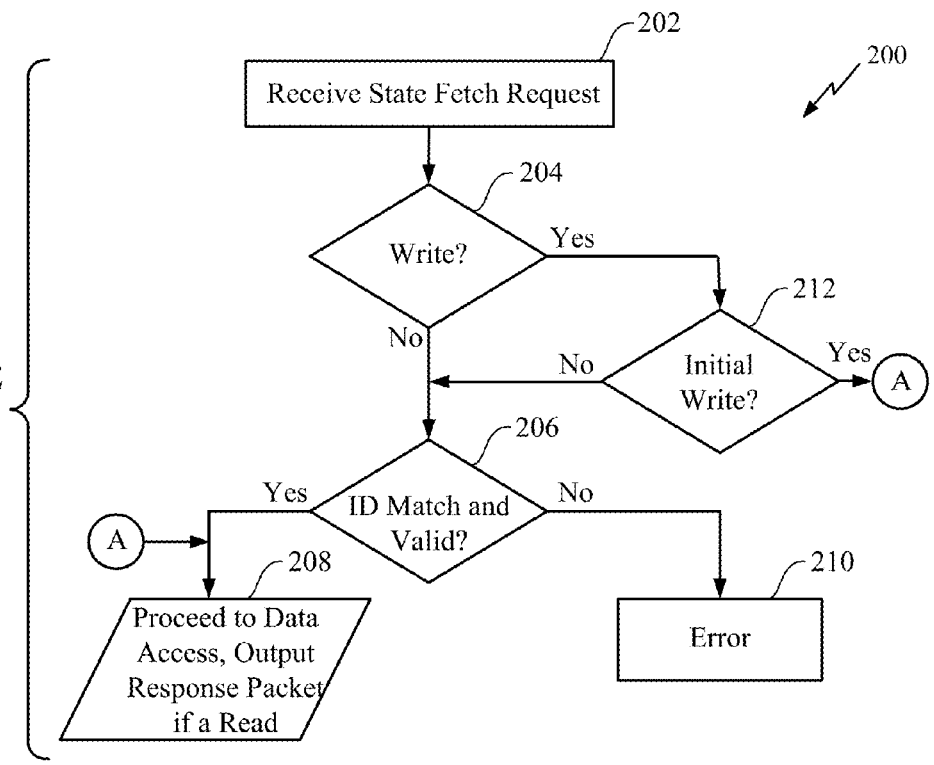
FIG. 2 shows one flow diagram of example operations in one process of ID-qualified access machine state storage and retrieval in accordance with one or more aspects.

FIG. 2 shows one flow diagram 200 of example operations in one process of ID-based secure accessing of a machine state storage, in accordance with one or more aspects. Operations can include receiving at 202 a machine state access request, at a non-volatile memory having a machine state table capable of storing one or more current valid machine state entries. For example, the receiving at 202 may be a receiving by the ID-RA NVM 112 of FIG. 1, having the machine state table 116. The machine state access received at 202 may be a read access request, such as the fetch machine state request described in reference to FIG. 1 generated by the first CPU 102 or by the second CPU 104. For example, if the access request is a fetch machine state request it may be generated in response to a power-up signal, such as the power-up signal of the PWR CNTL CPU1, as previously described in this disclosure. The machine state access may be a write access request, such as the machine state vector described, in reference in to FIG. 1. Such a machine state vector may be generated, for example, by the first CPU 102 or the second CPU 104 in response to a power-down signal, such as the power-down signal of the PWR CNTL CPU1, as previously described in this disclosure.

Referring to FIG. 2, after the receiving at 202, operations according to the flow 200 may then depend on whether the received access request is a read access request or write access request, as represented by the decision block 204. For purposes of example, it will be assumed that the access request is a read access request, e.g., a fetch machine state request. It will therefore be assumed that the read access request has a security field having the requestor machine ID. Operations according to the flow 200 can then include determining, at 206, whether the requestor ID in the security field matches a current stored machine identifier of a current valid machine state entry of the machine state entry table, e.g., the machine state table 116 of the ID-RA NVM 112. Operations according to the flow 200 can include, in response to determining at 206 that the requestor machine ID does match the current stored machine identifier of a current valid machine state entry, proceeding to the access at 208 to read from the machine state entry table and outputting a response packet having the requested machine state. Operations according to the flow 200 can include, in response to determining at 206 that the requestor machine ID does not match the current stored machine identifier of a current valid machine state entry, proceeding to generate an error at 210.

Continuing to refer to FIG. 2, for another example, it will be assumed that the access request at 202 is a write access request, e.g., machine state vector. Operations according to the flow 200 can then include determining, at 212, whether the write of the machine state vector will be an initial write to the machine state entry table. If the write of the machine state vector is determined at 212 to be an initial write, then operations according to the flow 200 can proceed to the access at 208, and write a new current valid machine state entry into the machine state entry table. If the write of the machine state vector is determined at 212 to not be an initial write, operations according to the flow 200 can proceed to 206, and determine whether the machine ID in the security field matches a current stored machine identifier of a current valid machine state entry of the machine state entry table.

Figure 3:
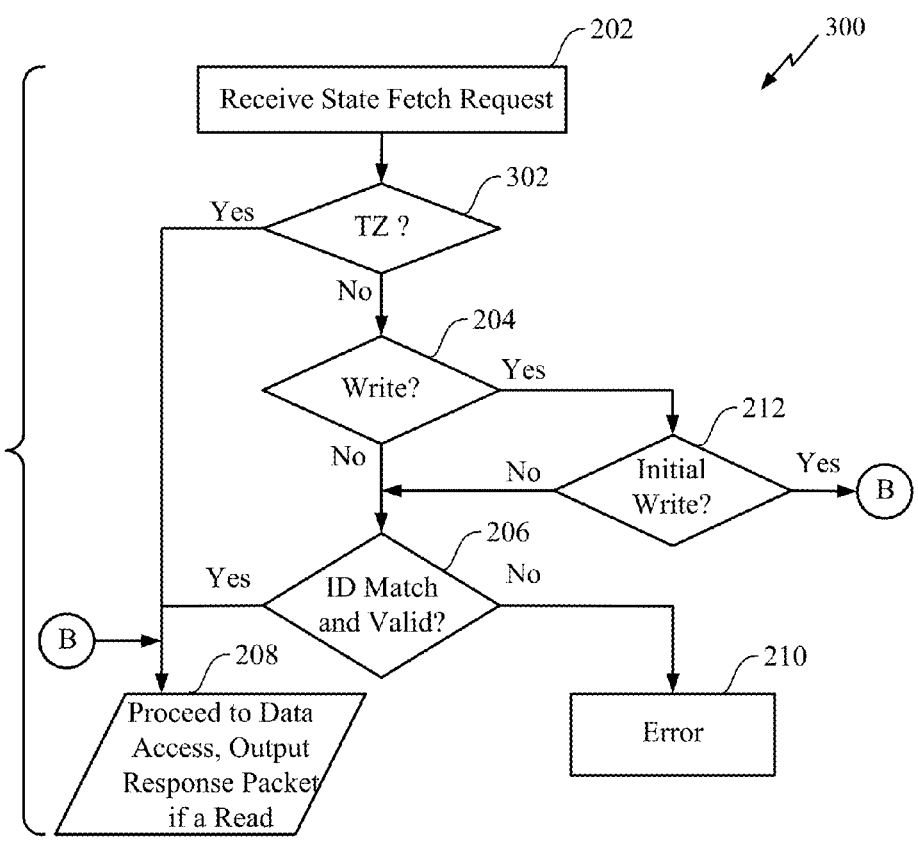
FIG. 3 shows one flow diagram of example operations in another process of secure, ID-qualified access machine state storage and retrieval in accordance with one or more aspects.

FIG. 3 shows one flow diagram 300 of operations in one process of ID-based secure accessing of a machine state storage, in accordance with other aspects. Operations according to the flow diagram 300 can be identical to operations according to the FIG. 2 flow diagram 200, with an additional feature of providing a trusted zone access, at 302, overriding the security check against ID. The trusted zone access at 302 may be, for example, according to conventional ARM TrustZone techniques, or other generally comparable known, conventional trusted zone access techniques. Persons of ordinary skill on the art, based on the present disclosure, can readily adapt such known, conventional trusted zone techniques to responding to a trusted zone access request in practices according one or more disclosed aspects, without undue experimentation. Further detailed description of such known, conventional trusted zone techniques is therefore omitted.

Figure 4:
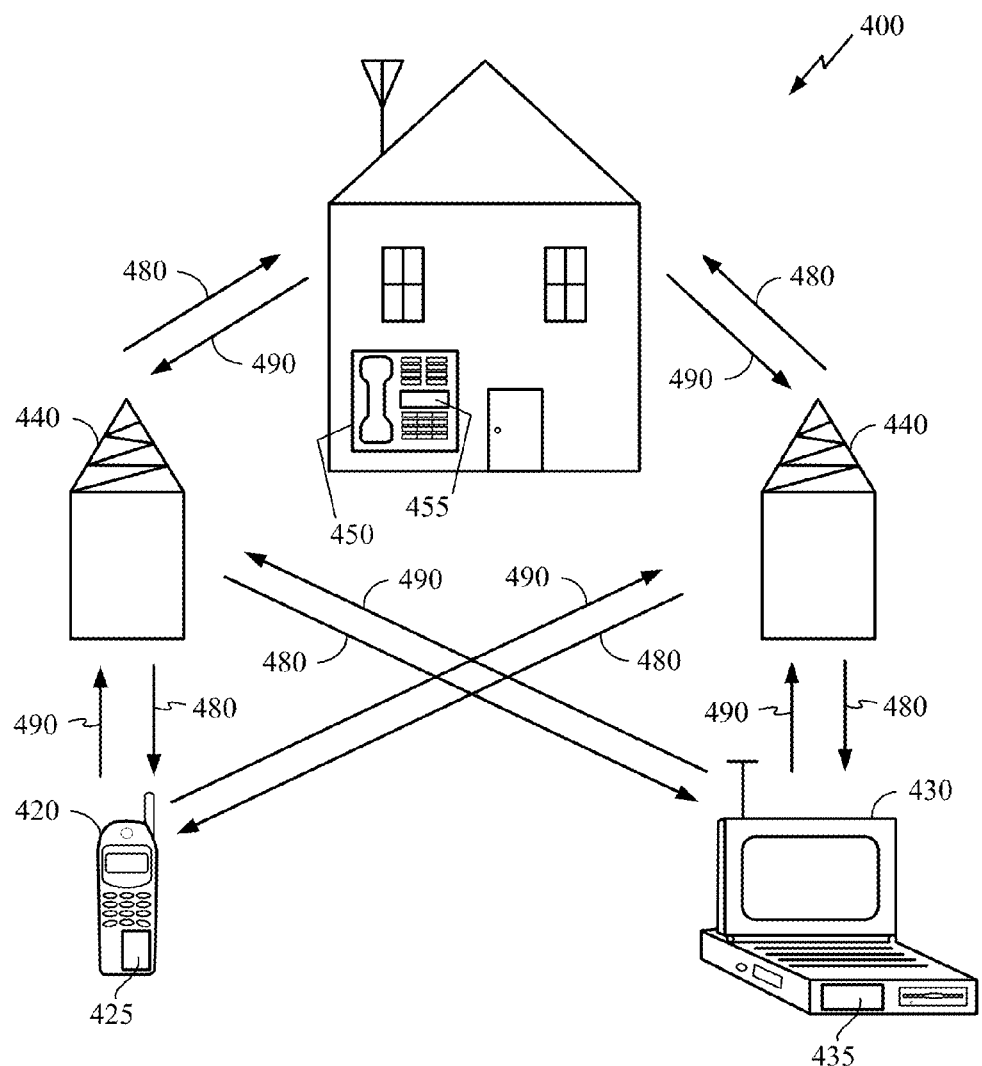
FIG. 4 shows one example functional schematic of one example personal communication and computing device in accordance with one or more aspects.

FIG. 4 illustrates an exemplary communication system 400 in which one or more aspects of the disclosure, e.g., as described in reference to any one or more of FIG. 1, 2 or 3. For purposes of illustration, FIG. 4 shows three remote units 420, 430, and 450 and two base stations 440. It will be recognized that conventional wireless communication systems may have many more remote units and base stations. The remote units 420, 430, and 450 include integrated circuit or other semiconductor devices 425, 435 and 455 having one or more pillar inductors in accordance with one or more of the disclosed aspects, e.g., as described in reference to any one or more of FIGS. 4A-4D or 6. FIG. 4 shows forward link signals 480 from the base stations 440 and the remote units 420, 430, and 450, and shows reverse link signals 490 from the remote units 420, 430, and 450 to the base stations 440.

In FIG. 4, the remote unit 420 is shown as a mobile telephone, the remote unit 430 is shown as a portable computer, and the remote unit 450 is shown as a fixed location remote unit in a wireless local loop system. These are only examples, both in terms of quantity and type. For example, the remote units 420, 430 and 450 may be one of, or any combination of a mobile phone, hand-held personal communication system (PCS) unit, portable data unit such as a personal data assistant (PDA), navigation device (such as GPS enabled devices), set top box, music player, video player, entertainment unit, fixed location data unit such as meter reading equipment, or any other device that stores or retrieves data or computer instructions, or any combination thereof. Although FIG. 4 illustrates remote units according to the teachings of the disclosure, the disclosure is not limited to these exemplary illustrated units. Aspects may be suitably employed in any device having active integrated circuitry including memory and on-chip circuitry for test and characterization.

The foregoing disclosed devices and functionalities, e.g., as described in reference to any one or more of FIGS. 1-3 may be designed and configured into computer files (e.g., RTL, GDSII, GERBER, etc.) stored on computer readable media. Some or all such files may be provided to fabrication handlers who fabricate devices based on such files. Resulting products include semiconductor wafers that are then cut into semiconductor die and packaged into a semiconductor chip. The chips are then employed in devices described above.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

While the foregoing disclosure shows illustrative aspects and applications f the invention, it should be noted that various changes and modifications may be made herein without departing from the scope of the invention as defined by the appended claims.

What is claimed is:

1. A method for secure storage of a machine state, comprising:
   receiving at a memory a machine state vector from a central processing unit (CPU), the machine state vector comprising a machine state and a machine identifier of the CPU, wherein the machine state is a state of the CPU identified by the machine identifier;
   determining by the memory, upon receiving the machine state vector, whether a write access qualification is satisfied, wherein the determining comprises:
     determining by the memory whether a writing of a machine state entry for the CPU identified by the machine identifier will be an initial write, wherein the initial write is the write of the machine state entry for the CPU identified by the machine identifier; and
     upon determining that the writing of the machine state entry will be the initial write, establishing by the memory the write access qualification as satisfied;
   upon determining that the write access qualification is satisfied, storing by the memory, a current valid machine state entry in the memory for the CPU based on the machine state vector, the current valid machine state entry for the CPU comprising the machine state of the CPU and, as a current machine identifier associated with the current valid machine state entry, the machine identifier of the CPU;
   receiving, at the memory, a fetch machine state request from the CPU, wherein the fetch machine state request includes a requestor machine identifier of the CPU;
   upon receiving the fetch machine request, determining by the memory whether a machine state retrieval qualification is met, wherein the machine state retrieval qualification includes the requestor machine identifier matching the current machine identifier associated with the current valid machine state entry stored in the memory; and
   upon determining that the requestor machine state retrieval qualification is met, sending by the memory a response packet to the CPU, the response packet including the machine state of the current valid machine state entry.

2. The method of claim 1, wherein associated with the initial write is the write of the machine state entry for the CPU when the memory does not already store any current valid machine state entry.

3. The method of claim 2, further comprising:
   upon determining that the writing of the machine state entry will not be the initial write, determining by the memory whether the machine identifier in the machine state vector matches a current machine identifier associated with the current valid machine state entry; and
   upon determining that the machine identifier in the machine state vector matches the current machine identifier associated with the current valid machine state entry, establishing by the memory the write access qualification as being satisfied.

4. The method of claim 3, further comprising:
upon determining that the machine identifier in the machine state vector does not match the current machine identifier associated with the current valid machine state entry, generating by the memory an error signal.

5. The method of claim 2,
wherein the machine state entry includes a validity field,
wherein the validity field is switchable between a valid value and an invalid value, and
wherein determining whether the writing of the machine state entry will be the initial write is based on the validity field.

6. The method of claim 5, wherein storing the current valid machine state entry includes setting by the memory the validity field of the current valid machine state entry to the valid value.

7. The method of claim 6,
wherein the machine state retrieval qualification includes a concurrency of the validity field of the current valid machine state entry being at the valid value and the requestor machine identifier matching the current machine identifier associated with the current valid machine state entry; and
wherein the method further comprises upon determining that the machine state retrieval qualification is met, setting by the memory the validity field of the current valid machine state entry of the CPU to the invalid value.

8. The method of claim 7, further comprising:
upon determining that the requestor machine identifier does not match the machine identifier associated with the current valid machine state entry, generating by the memory an error signal.

9. The method of claim 7, further comprising:
initializing the memory,
wherein the initializing the memory includes setting the validity field of a machine state entry to the invalid value.

10. The method of claim 9, wherein storing the current valid machine state entry includes setting by the memory the validity field of the current valid machine state entry to the valid value.

11. The method of claim 9, further comprising,
determining by the memory, based on the validity field of the machine state entry when the machine state vector is received from the CPU, whether the writing of the machine state entry will be the initial write,
wherein the initial write is a write to the machine state entry when the validity field of the machine state entry for the CPU is at the invalid value, and a not initial write is a write to the machine state entry when the validity field of the machine state entry for the CPU is at the valid value,
wherein determining whether the write access qualification is being satisfied further includes, in response to determining that the machine state vector is not the initial write, determining by the memory whether the machine identifier in the received machine state vector matches a current valid machine identifier associated with the current valid machine state entry.

12. The method of claim 1, further comprising:
upon determining the requestor machine identifier does not match any of the current machine identifiers, not sending the response packet and generating by the memory an error signal.

13. The method of claim 1, further comprising:
storing the machine identifier in a non-volatile register of the CPU.

14. The method of claim 13, further comprising, after storing the machine identifier in the non-volatile register of the CPU:
receiving at the CPU a power-down signal and, in response to the power-down signal, generating by the CPU the machine state vector,
wherein the generating the machine state vector includes:
reading by the CPU the machine identifier from the non-volatile register; and
inserting by the CPU the machine identifier in the machine state vector.

15. The method of claim 14,
wherein the machine state vector includes a security field, and
wherein the inserting the machine identifier in the machine state vector includes inserting by the CPU the machine identifier in the security field.

16. The method of claim 1, further comprising:
receiving at the memory a trusted zone access request from the CPU; and
accessing by the memory the machine state entry in the memory in accordance with the trusted zone access request.

17. The method of claim 1,
wherein the CPU and the memory are parts of an ID-restricted machine state storage and retrieval (IDS-SR) system, the IDS-SR system further comprising a system bus,
wherein receiving the machine state vector comprises receiving at the memory the machine state vector from the CPU over the system bus,
wherein receiving the fetch machine state request comprises receiving at the memory the fetch machine state request from the CPU over the system bus, and
wherein sending the response packet comprises sending by the memory the response packet to the CPU over the system bus.

18. An apparatus for secure memory state storage, comprising:
a memory configured to store a machine state entry, wherein the machine state entry includes an access security field and a machine state field, wherein the access security field is configured to hold a machine identifier and the machine state field is configured to hold a machine state; and
a memory access logic configured to control access to the machine state entry in the memory, wherein the memory access logic is further configured to:
receive a machine state vector from a central processing unit (CPU), wherein the machine state vector includes a machine state and a machine identifier of the CPU,
determine, upon receiving the machine state vector, whether a write access qualification is satisfied,
upon determining that the write access qualification is satisfied, store, in the memory, a current valid machine state entry for the CPU based on the machine state vector, the current valid machine state entry for the CPU comprising the machine state of the CPU, and, as a current valid machine identifier associated with the current valid machine state entry, the machine identifier of the CPU, in a manner retrievable based on the current valid machine identifier, receive a fetch machine state request from the CPU, wherein the fetch machine state request includes a requestor machine identifier of the CPU, upon receiving the fetch machine request from the CPU, determine whether a machine state retrieval qualification is met, wherein the machine state retrieval qualification includes the requestor machine identifier matching the current machine identifier associated with the current valid machine state entry stored in the memory, and upon determining that the requestor machine state retrieval qualification is met, send a response packet to the CPU, the response packet comprising the machine state of the current valid machine state entry.

19. The apparatus of claim 18, wherein the memory access logic is further configured to generate an error signal upon determining that the write access qualification is not satisfied.

20. The apparatus of claim 18, wherein the memory access logic is further configured to store the machine state entry to include a validity field, and to selectively switch the validity field between a valid value and an invalid value, and to include in the machine state field in the machine state entry a setting of the validity field of the machine state entry for the CPU to the valid value.

21. The apparatus of claim 18, wherein the memory comprises a non-volatile magneto-resistive memory.

22. The apparatus of claim 18, the CPU comprising an interface to the memory access logic, wherein the CPU includes:

a machine ID register configured to store a machine ID of the CPU;

a machine state register configured to store the machine state of the CPU; and a logic, configured to receive power-down signal and, in response, to read the machine state from the machine state register, read the machine ID from the machine ID register, and generate the machine state vector, based at least in part on the machine ID and the machine state, wherein the machine state vector includes the machine ID and the machine state.

23. The apparatus of claim 18, further comprising a system bus, wherein the memory access logic is configured to:

receive the machine state vector from the CPU over the system bus, receive the fetch machine state request from the CPU over the system bus, and send the response packet to the CPU over the system bus.

24. An apparatus for secure memory state storage, comprising:

means for receiving a machine state vector from a central processing unit (CPU), wherein the machine state vector includes a machine state and a machine identifier of the CPU, the machine state being a state of the CPU identified by the machine identifier;

means for determining, upon receiving the machine state vector, whether a write access qualification is satisfied, wherein the means for determining includes:

means for determining whether a writing of a machine state entry for the CPU to a memory will be an initial write, wherein the initial write is a write of the machine state entry for the CPU when the memory does not already currently store any current valid machine state entry, and means for establishing, upon determining that the writing of the machine state entry will be the initial write, that the write access qualification is satisfied;

means for storing in the memory, upon the write access qualification being satisfied, a current valid machine state entry for the CPU based on the machine state vector, the current valid machine state entry for the CPU comprising the machine state of the CPU and, as a current machine identifier associated with the current valid machine state entry, the machine identifier of the CPU, in a manner retrievable based on the current machine identifier;

means for receiving a fetch machine state request from the CPU, wherein the fetch machine state request includes a requestor machine identifier of the CPU;

means for determining, upon receiving the fetch machine state request, whether a machine state retrieval qualification is met, wherein the machine state retrieval qualification includes the requestor machine identifier matching the current machine identifier associated with the current valid machine state entry stored in the memory; and means for sending, upon determining that the requestor machine state retrieval qualification is met, a response packet to the CPU, the response packet including a machine state of the current valid machine state entry.

25. The apparatus of claim 24, further comprising:

means for determining, upon determining that the writing of the machine state entry will not be the initial write, whether the machine identifier in the machine state vector matches a current machine identifier associated with the current valid machine state entry; and means for establishing, upon determining that the machine identifier in the machine state vector matches the current machine identifier associated with the current valid machine state entry, the write access qualification as being satisfied.

26. The apparatus of claim 25, further comprising:

means for generating an error signal upon determining that the machine identifier in the machine state vector does not match the current machine identifier associated with any of the current valid machine state entries.

27. The apparatus of claim 24, further comprising a system bus, wherein the means for receiving the machine state vector comprises means for receiving the machine state vector from the CPU over the system bus, wherein the means for receiving the fetch machine state request comprises means for receiving the fetch machine state request from the CPU over the system bus, and wherein the means for sending the response packet comprises means for sending the response packet to the CPU over the system bus.

28. A non-transitory computer-readable medium comprising code, which, when executed by a memory access control logic, causes the memory access control logic to perform operations for secure storage of a machine state, the non-transitory computer-readable medium comprising code for causing the memory access control logic to:

receive a machine state vector from a central processing unit (CPU), wherein the machine state vector includes a machine state and a machine identifier of the CPU, the machine state being a state of the CPU identified by the machine identifier;

determine, upon receiving the machine state vector, whether a write access qualification is satisfied, wherein the code for causing the memory access control logic to determine whether the write access qualification is satisfied comprises code for causing the processor memory access control logic to:
- determine whether a writing of a machine state entry for the CPU to a memory will be an initial write, wherein the initial write is a write of the machine state entry for the CPU when the memory does not already store a current valid machine state entry, and
- establish, upon determining that the writing of the machine state entry will be the initial write, that the write access qualification is satisfied;

store in the memory, upon determining that the write access qualification is satisfied, a current valid machine state entry for the CPU based on the machine state vector, the current valid machine state entry for the CPU comprising the machine state for the CPU and, as a current valid machine identifier associated with the current valid machine state entry, the machine identifier of the CPU, in a manner retrievable based on the current machine identifier;

receive a fetch machine state request from the CPU, wherein the fetch machine state request includes a requestor machine identifier of the CPU;

upon receiving the fetch machine request, determine whether a machine state retrieval qualification is met, wherein the machine state retrieval qualification includes the requestor machine identifier matching the current machine identifier associated with the current valid machine state entry stored in the memory; and upon determining that the requestor machine state retrieval qualification is met, send a response packet to the CPU, the response packet including the machine state of the current valid machine state entry.

29. The non-transitory computer-readable medium of claim 28, further comprising code which, when executed by the memory access control logic, causes the memory access control logic to:
- determine, upon determining that the writing of the machine state entry will not be the initial write, whether the machine identifier in the machine state vector matches a current machine identifier associated with the current valid machine state entry; and
- establish, upon determining that the machine identifier in the machine state vector matches the current machine identifier associated with the current valid machine state entry, the write access qualification as being satisfied.

30. The non-transitory computer-readable medium of claim 29, further comprising code which, when executed by the memory access control logic, causes the memory access control logic to:
- generate an error signal upon determining that the machine identifier in the machine state vector does not match the current machine identifier associated with the current valid machine state entry.

31. The non-transitory computer-readable medium of claim 28,
- wherein the memory access control logic and the CPU are parts of an ID-restricted machine state storage and retrieval (IDS-SR) system, the IDS-SR system further comprising a system bus,
- wherein the code to receive the machine state vector causes the memory access control logic to receive the machine state vector from the CPU over the system bus,
- wherein the code to receive the fetch machine state request causes the memory access control logic to receive the fetch machine state request from the CPU over the system bus, and
- wherein the code to send the response packet causes the memory access control logic to send the response packet to the CPU over the system bus.

* * * * *